Inventor
John J. Malpass

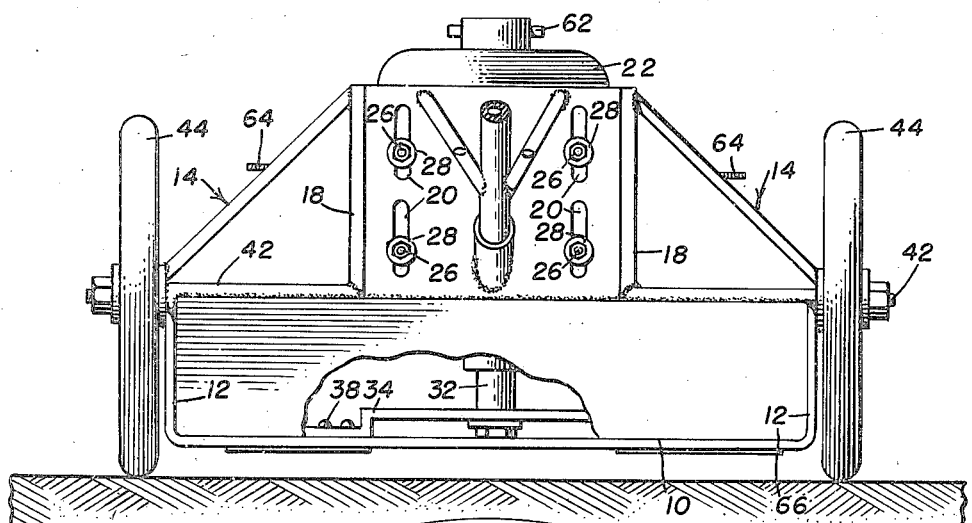
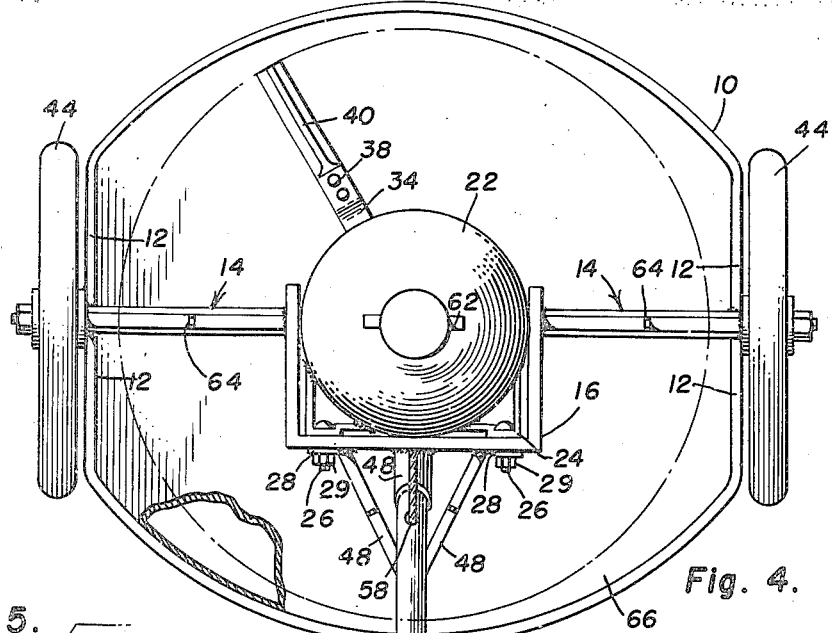
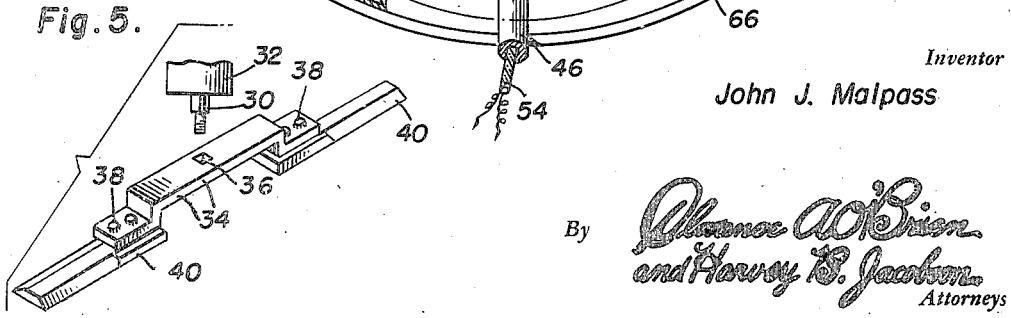

Patented Sept. 6, 1949

2,480,944

UNITED STATES PATENT OFFICE 2,480,944

ELECTRIC LAWN MOWER

John J. Malpass, Burgaw, N. C.

Application February 19, 1947, Serial No. 729,545

1 Claim. (Cl. 56—25.4)

This invention appertains to new and useful improvements in devices particularly adapted to cut or trim flora.

An object of this invention is to provide a guard means for protecting the cutter blades, shrubbery, the operator of the invention and for preventing the said cutter blades from digging into the turf.

Another object of this invention is to provide multi-ground cutter blades which may be interchangeably used.

Another object of this invention is to provide simple and efficient adjusting means for mounting the power means and cutter means.

A still further object of this invention is to provide an improved baffle means for protecting the operator from flying flora yet not clogging the cutter mechanism.

A still further object of this invention is to provide an improved handle means to be used in conjunction therewith.

A still further object of this invention is to provide an extremely simple flora cutting device which may be manufactured very economically and which has the working parts accessible for repair purposes.

Ancillary objects and features of novelty shall become apparent to those skilled in the art in following the description of the preferred embodiment of the present invention illustrated in the accompanying drawings, wherein:

Figure 3 is an elevational back view of the invention disclosed in Figure 1 with the handle means broken away;

Figure 4 is a top view of the invention disclosed in Figure 1 with said handle broken away and portions of the baffle means broken away also to show details of construction, and Figure 5 is a perspective view of the removable cutter blades and their associated retaining means.

Figure 1:
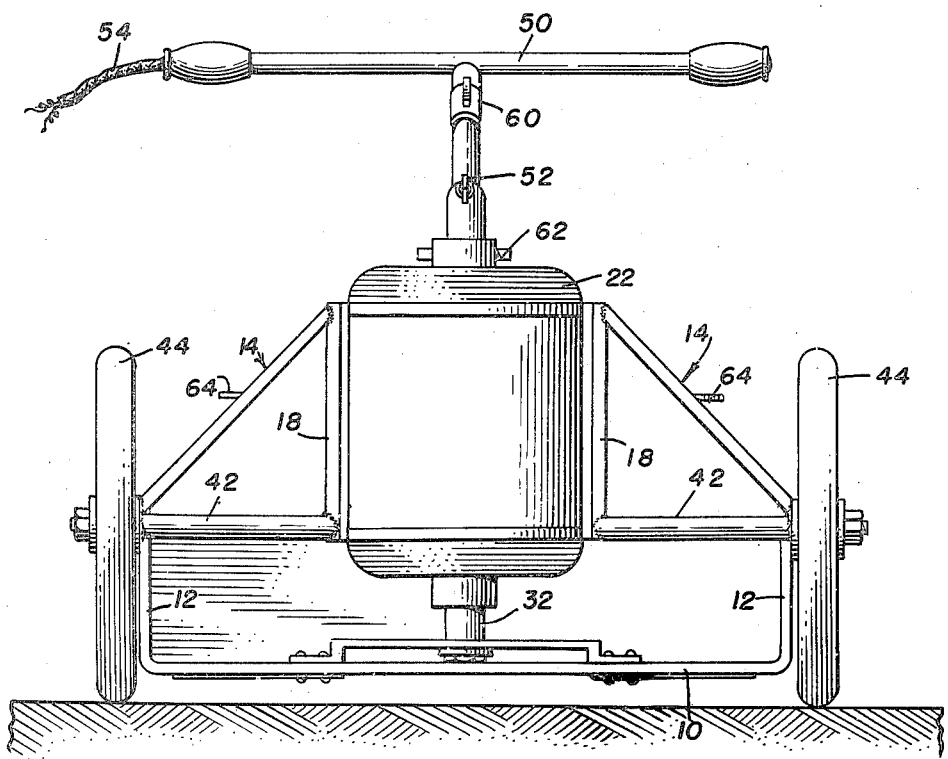
Figure 1 is an elevational front view of the preferred embodiment of the present invention.

Referring now in detail to the illustrated preferred embodiment of the present invention, like reference characters are used throughout to indicate similar elements in the views thereof. This invention has been devised to provide the most inexpensive mower that can be made without sacrificing strength, rigidity and efficiency. The simplest sort of structure, utilizing conventional shop practices, has been provided in carrying out the above mentioned objects of this invention.

An annular ring or bumper means 10 is provided with upwardly extending brackets 12 diametric of each other. As is seen in Figure 4, the said annulus 10 is somewhat elliptical, however, it is within the purview of this invention to fabricate said annulus in substantially a perfect circle.

The said upwardly extending brackets 12 are in pairs, one pair to each side of the said annulus and said brackets terminate at an apex whereupon triangular frame members or truss members, generally indicated at 14, are secured. The preferable securing means at this junction and at each junction of the said triangular frame members is by conventional welding, brazing or the like.

A substantially U-shaped bracket 16 is rigidly secured to selected vertical legs 18 of the said trusses 14. A plurality of aligned slots 20 are provided in the web of said channel member 16 for the purposes to be described herein now.

A suitable source of power, preferably the electric motor 22 disclosed in the drawings is provided with a substantially U-shaped member 24 rigidly secured thereto. A plurality of fastening means, preferably lugs or bolts 26 project through said bracket 24 and are adapted to be received in the said slots 20. Suitable conventional washers 28 and nuts 29 may be used in conjunction with the said bolts 26 for selectively securing the same in the slots 20. It is now apparent that the motor 22 may be adjusted relative to the U-channel 16 and therefore the annulus 10 by simply manipulating the bolts 26 and their associated nuts and washers.

Depending from the motor 22 is the conventional power take-off shaft 30 having a suitable thrust bearing 32 therearound. The end of the said shaft 30 is provided with a rectangular cross section for receiving a blade holding bracket 34 in fixed relation relative thereto. For this purpose, a complemental aperture 36 is provided through said link or bracket 34 for convenient reception on the said shaft 30. Removably received on the said bracket 34 is a plurality of blades, preferably two, and said blades are adapted to be interchangeable. Any suitable securing means may be used, however, simple bolts 38 provide the preferred construction. The said cutter blades 40 are ground on each side thereof providing a pair of cutting edges thereby obviating exactly half of the sharpening process if a reversible motor is utilized at 22. The preferable adjustment of the said cutter blades is such that when the mower is tilted forward or backward the bumper or annulus 10 strikes the ground before the blade digs therein. It is further noted that a pair of stub shafts 42 provide the lower leg of the said triangular truss 14 and wheels 44 are journaled at the terminal portions thereof. The said wheels 44 are preferably journaled in conventional anti-friction bearings for obvious reasons.

An upwardly inclined handle sleeve member 46 is received in a perch 48, said perch being rigidly secured to the substantially U-shaped bracket member 16. Suitable bracing members 48 are secured between said members 16 and the said hollow or tubular handle member 46. A rod 48 having a suitable transverse gripping portion 50 at one end thereof is received in the bore of the said tube 46. The said tube 46 and rod 48 are slidable relative to each other and are held in fixed relation by means of a suitable conventional thumb nut 52. Obviously, other securing means such as a plurality of thumb nuts, set screws or the like may be used in place of the single thumb nut 52 disclosed in the drawings.

Figure 2:
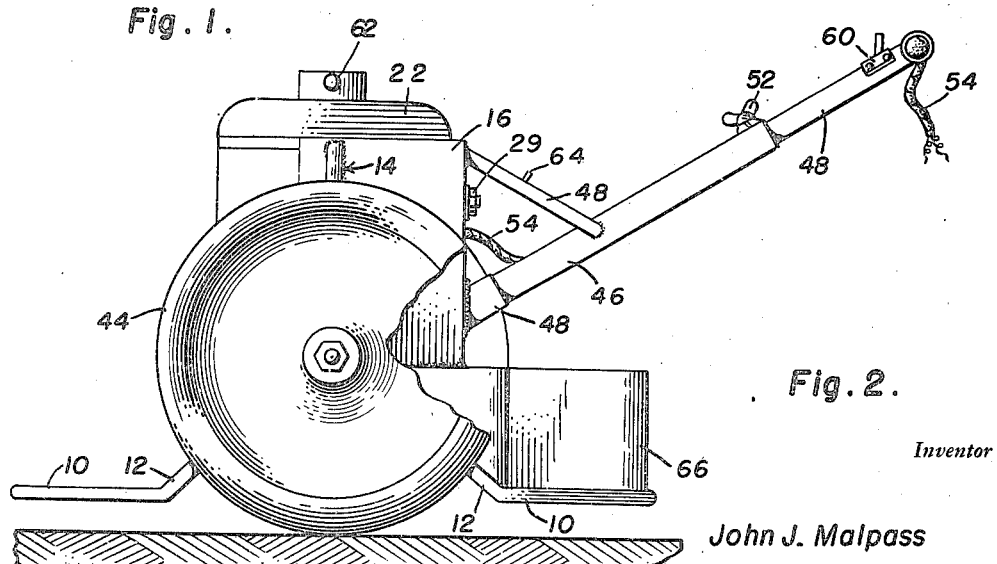
Figure 2 is an elevational side view of the invention disclosed in Figure 1 with parts broken away for the purpose of disclosing details of construction.

In wiring the invention, the preferable construction is to run an ordinary conductor 54 through said gripping portion 50, downwardly through the members 48 and 46, thence extending to a suitable aperture 58 provided in the said member 56 adjacent the motor 22. Of course, the conductor 54 may then be led directly to the motor as is seen in Figures 2 and 4. A suitable conventional switch 60 may be provided on the handle member 48 adjacent the gripping portion 50.

For convenience a handle portion 62 may be provided at the top portion of the said motor 22. Also, a plurality of hooks 64 are provided on selected rods and links of the supporting members for winding the said cord or conductor 54 therearound when the invention is inoperative.

Forming an important part of this invention is the baffle means 66 provided at the rearward portion of the said annulus 10 for the purpose of protecting the operator from flying flora and for the purpose of additional protection accidents arising from contact with the blades while said blades are revolving. It is noted that the said baffle 66 follows the general configuration of the said annulus 10 at the rearward or handle portion of the invention and is upwardly extending providing a recess thereunder. By this construction, flying grass or the like will have ample room to be ejected backward, strike the baffle and fall harmlessly to the ground. This construction defines over the usual straight baffle by the provision of ample space thereunder, obviating the difficulty of the cut vegetation jamming in the blades and also the blades' associated mechanism.

It is apparent that the single preferred embodiment of the present invention, capable of performing all the specifically mentioned objects as well as other objects, has been fully set forth and described. However, it is apparent to those skilled in the art that various changes including omissions and additions may be made herein without departing from the spirit of the invention. Accordingly, limitation is sought only in accordance with the scope of the following claim.

Having thus described this invention what is claimed as novel and improved is as follows:

A power mower comprising an annulus consisting of front and rear arcuate sections connected by side upstanding brackets, a pair of wheels secured to the upper ends of said brackets, a motor, adjustable supporting means for said motor secured to said brackets, a telescoping handle secured to said adjustable supporting means and a baffle on said annulus adjacent said handle, said adjustable supporting means comprising a channel member rigidly secured to said motor, a slotted plate secured to said brackets, adjustable friction fastening means extending through said slotted plate and secured to said channel member, said baffle comprising a housing having a peripheral configuration complemental to the shape of the arcuate sections of said annulus thereby preventing cut flora from being projected against the operator of said handle.

JOHN J. MALPASS.

REFERENCES CITED

The following references are of record in the file of this patent:

UNITED STATES PATENTS

| Number | Name | Date |
|---|---|---|
| 186,948 | Otto | Feb. 6, 1877 |
| Re. 18,944 | Beazley | Sept. 12, 1933 |
| 2,253,452 | Urschel | Aug. 19, 1941 |
| 2,302,472 | Power | Nov. 17, 1942 |
| 2,329,185 | Coddington | Sept. 14, 1943 |